United States Patent
Cepulis et al.

(10) Patent No.: US 7,873,850 B2
(45) Date of Patent: Jan. 18, 2011

(54) SYSTEM AND METHOD OF CONTROLLING POWER CONSUMPTION AND ASSOCIATED HEAT GENERATED BY A COMPUTING DEVICE

(75) Inventors: Darren J. Cepulis, Houston, TX (US); Vincent Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1129 days.

(21) Appl. No.: 11/546,096

(22) Filed: Oct. 11, 2006

(65) Prior Publication Data

US 2008/0091962 A1 Apr. 17, 2008

(51) Int. Cl.
*G06F 1/32* (2006.01)

(52) U.S. Cl. .................................. 713/324; 713/320

(58) Field of Classification Search ................ 713/300, 713/320, 324
See application file for complete search history.

(56) References Cited

U.S. PATENT DOCUMENTS

| | | | |
|---|---|---|---|
| 2005/0232192 A1* | 10/2005 | Rawson | 370/329 |
| 2006/0253633 A1* | 11/2006 | Brundridge et al. | 710/104 |
| 2008/0040563 A1* | 2/2008 | Brittain et al. | 711/154 |

* cited by examiner

*Primary Examiner*—Chun Cao

(57) ABSTRACT

Embodiments of a system and method for controlling power consumption in a computing device having at least one CPU and memory. Embodiments reduce or increase the amount of memory available to the at least one CPU in response to changes in power consumption and/or changes in temperature. In some embodiments the amount of memory accessible to the CPU is decreased or increased, in other embodiments the power setting applied to portions of memory is decreased or increased.

22 Claims, 4 Drawing Sheets

SYSTEM AND METHOD OF CONTROLLING POWER CONSUMPTION AND ASSOCIATED HEAT GENERATED BY A COMPUTING DEVICE

BACKGROUND OF THE INVENTION

Many stationary and portable current computing devices offer considerable performance advantages and features over similar prior devices. One reason for this is that constant commercial pressure for competitive advantage has tended to improve performance and add or enhance features in computing devices with passing time. Unfortunately, it is often the case that each improvement in performance or features causes an increase in power consumption and associated generation of heat.

Even with current power savings technologies, at times many of these current computing devices consume undesirable amounts of electrical power and/or generate undesirable quantities of waste heat. One reason this is undesirable is because use of large amounts of electrical power can be expensive, for example, in the case of a large server farm. These costs are often compounded by the need to employ air conditioning to remove waste heat, thereby further increasing costs to maintain these computing devices. Another reason this is undesirable it that without sufficient cooling, excessive heat can damage or decrease the lifetime of current computing devices.

Cumulative societal use of electricity can add considerable strain on electrical power grids, especially on hot days when many businesses and residences are already using copious quantities of electrical power. In these situations, sometimes electrical utilities contact customers asking them to reduce their power consumption to avert a brown out, which would be to the detriment of all. It is desirable to be able to reduce use of electrical power by computing devices in this and numerous other situations.

Some current computer processors have the ability to lower central processor unit (CPU) clock speed and voltage, and thus power consumption. Information Technology (IT) administrators may attempt to decrease power consumption in large installations by configuring computer processors offline for the desired power state. Unfortunately, offline configuration takes time and attention from the IT administrator and requires the server to be taken out of use temporarily. Furthermore, reducing processor clock speed may result in insufficient power savings and heat reduction. It is desirable to at least partially address some of these limitations to reduce power consumption and the generation of undesirable heat in current computing devices.

DETAILED DESCRIPTION OF PREFERRED EMBODIMENT

Figure 1:
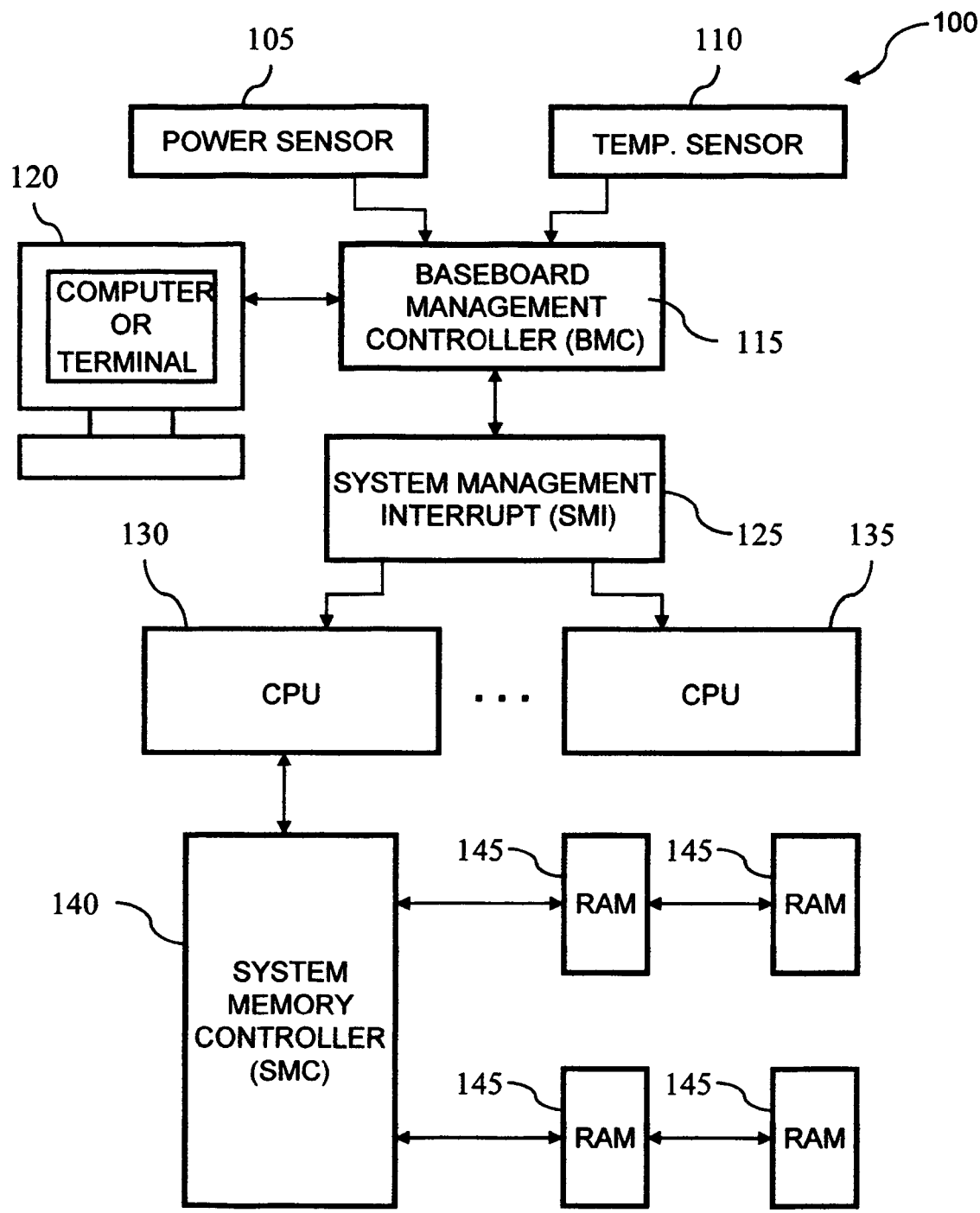
FIG. 1 is a block diagram representing an overview of some embodiments.

In the following description of the invention, reference is made to the accompanying drawings, which form a part hereof, and in which is shown by way of illustration specific examples in which the invention may be practiced. It is to be understood that other embodiments may be utilized and structural changes may be made without departing from the scope of the present invention.

Overview:

Embodiments provide a system and method for manually and/or automatically controlling the access and use of memory in computing devices to control electrical power consumption and corresponding waste heat production. Embodiments provide a range of memory management selections to optimize system performance versus electrical power consumption and heat production. By way of example, some embodiments employ Hewlett-Packard® server blades, but the present invention is not limited to any particular computing device or devices.

Power and temperature sensors are used to provide input signals to a Baseboard Management Controller (BMC). The BMC receives instructions and memory control parameters from a computer or terminal in communication with the BMC. The computer or terminal can be any kind of a computing device, such as a personal computer (PC), laptop computer, another server, hand-held computing device such as a personal digital assistant (PDA), workstation, computer terminal, etc., and can be directly coupled or remote to the BMC. For example, the computer or terminal can be coupled to the BMC via the Internet or other network. The computer or terminal can also be an Information Technologies (IT) administrative computer or terminal used by an IT administrator. A user at the computer or terminal can manually control memory utilization, and also has the option to set the memory control parameters of power and/or temperature. Setting the memory control parameters will control memory utilization in order to adjust performance versus power use and temperature. These limits can be a function of time as well. For example, reduced power and temperature settings can be employed at night when performance may become secondary.

In some embodiments, the BMC sends signals to a System Management Interrupt (SMI) device which causes an appropriate SMI interrupt signal to be sent to a Central Processing Unit (CPU). In some alternative embodiments the BMC drives the SMI interrupt signal directly to the CPU. In either case, upon receipt of the SMI interrupt signal, an interrupt handling routine causes the CPU to enter a System Management Mode (SMM) and execute SMM code residing in the CPU's system Read-Only Memory (system ROM) thereby causing the CPU to initiate an appropriate response.

In other alternative embodiments a remote terminal and BMC are not required and the signals are passed through an Advanced Configuration and Power Interface (ACPI) to the CPU, or through option settings in a Read-Only Memory (ROM)-Based Set Up (RBSU) utility, causing the CPU to enter SMM as described herein. For example, with the RBSU utility, a local user can configure the system by selecting displayed options via an embedded setup program. That setup program, included as part of the system BIOS, presents a list of power options and memory configuration choices for the power savings features as recited herein. Therefore, the setup program allows for the enabling and configuring of options affecting relatively immediate and scheduled electrical power savings and thermal power savings. The settings are stored in non-volatile memory in the system and are used by the system BIOS to enable and control the power savings features. In some alternative embodiments, a computing device such as a personal computer (PC), laptop computer, server, hand-held computing device such as a personal digital assistant (PDA), workstation, computer terminal, etc., is used to control its own setup program, included as part of the system BIOS.

Once in SMM, the CPU directs a System Memory Controller (SMC) coupled to the CPU to perform a designated memory control function in conjunction with system Random Access Memory (RAM). For relatively smaller adjustments in system performance versus power consumption and/or heat generation, the SMC is directed to control access to portions of RAM. For example, if a relatively small reduction in power consumption and/or heat generation is indicated, then a corresponding amount of RAM can be made inaccessible to the CPU by the SMC, on the other hand, if more system performance is desired, then a corresponding amount of RAM can be made accessible to the CPU up to the amount of RAM available.

If greater changes in system performance versus power consumption and/or heat generation are indicated, an appropriate power level is selected from a plurality of power levels for the system RAM. For example, if a greater reduction of power consumption and/or heat generation than can be desirably achieved by reducing memory access as described above is desired, then a corresponding portion of the system RAM can be switched to a low power state. On the other hand if conditions are such that greater performance is desired, the system RAM can be switched to a higher power state by reprogramming the SMC.

If still greater changes in system performance versus power consumption and/or heat generation are indicated, corresponding portions of system RAM can be selected for addition or removal under power, also known as "hot add" and "hot remove". For example, if an even greater reduction in power consumption and/or heat generation is indicated, the SMC can be directed "hot remove" corresponding portions of system RAM. Those portions may or may not be actually removed, but power to them is essentially eliminated and the OS and SMC treat those portions of memory as unavailable even if the RAM devices are not physically removed. On the other hand, if additional performance is desired, the memory can be hot added back into the system and will be recognized by the OS and SMC.

Finally, combinations of these three methods may be employed to achieve reductions in power consumption and/or heat generation.

Detailed Components and Steps:

FIG. 1 is a block diagram representing an overview of some embodiments which include a computing system 100 having at least one power sensor 105 and at least one temperature sensor 110. Other embodiments have either at least one power sensor 105 or at least one temperature sensor 110, but not both. Sensing other operational aspects of the system 100, including emissions of electromagnetic radiation, is also envisioned. The power sensor 105 and temperature sensor are coupled and accessible to a Baseboard Management Controller (BMC) 115. By way of example, the BMC 115 is of the type employed in various Hewlett-Packard® server blades. The BMC 115 receives signals from the power sensor 105 indicative of the amount of electrical power being consumed by the system 100. Furthermore, the BMC 115 receives signals from the temperature sensor 110 indicative of a temperature associated with the system 100. For example, the temperature sensor 110 can be positioned to measure incoming ambient air temperature, CPU temperature or any other temperature desired. In some embodiments, multiple temperature sensors 110 are employed to measure multiple temperatures associated with the system 100.

The BMC 115 is communicatively coupled to a computer or terminal 120. In some embodiments the computer or terminal 120 may be designated as an IT administrative computer or terminal 120. The computer or terminal 120 provides access to the BMC 115 and allows a user to monitor reported power and temperature signals transmitted from the power sensor 105 and temperature sensor 110, respectively. The computer or terminal 120 allows a user to set power and/or temperature limits with which to establish limits on system memory utilization. The computer or terminal 120 also allows a user to directly control memory utilization.

The BMC 115 receives input from the power sensor 105, temperature sensor 110 and computer or terminal 120 and compares those signals to limits set by a user through the computer or terminal 120 to determine when to transmit instructions to a System Management Interrupt (SMI) device 125, thereby activating the SMI 125. The SMI 125 is configured to transmit interrupt signals, including a unique SMI interrupt in response to activation by the BMC. These interrupt signals may be transmitted to a single CPU 130, or a plurality of CPUs 135. For clarity, this description will refer to only one CPU 130, although it is understood that there may be a plurality of CPUs 135 employed. Furthermore, in some alternative embodiments the BMC 115 drives the SMI interrupt signal directly to the CPU 130. In either case, upon receipt of the SMI interrupt signal, an interrupt handling routine causes the CPU 130 to enter System Management Mode (SMM) and execute SMM code residing in the CPU's 130 system Read-Only Memory (system ROM). The SMM causes the CPU 130 to query the BMC 115 for the state of its input signals regarding the system temperature and power consumption and calculates the appropriate action to take based on the system configuration. The SMM thereby allows the CPU 130 to react to changes in user instructions, temperature, and power essentially immediately or as a function of time. Correspondingly, the SMM then directs the CPU 130 to reprogram the System Memory Controller (SMC) 140.

The SMC 140 controls access and utilization of Random Access Memory (RAM) 145 used by the CPU 130 in the system 100. In some alternative embodiments the SMC 140 is also communicatively coupled to other devices, such as Input/Output (I/O) devices and can thereby control utilization of their memory in a similar fashion as the SMC 140 controls the RAM 145. As shown in FIG. 1, the RAM 145 is comprised of multiple separate memory modules controlled by the SMC 140. The SMC 140 receives instructions from the CPU 130 regarding control of RAM 145 and transmits signals back to the CPU 130 indicating the status of memory 145. As described herein, in embodiments the CPU 130 directs the SMC 140 to decrease or increase access to portions of memory, switch between different memory power settings and/or hot remove or hot add memory modules. In this way, the amount of electrical power consumed by the RAM 145 can be decreased to reduce power consumption and/or heat generation at the expense of decreased system 100 performance, or to increase performance at the expense of increased power consumption and heat generation.

Figure 2:
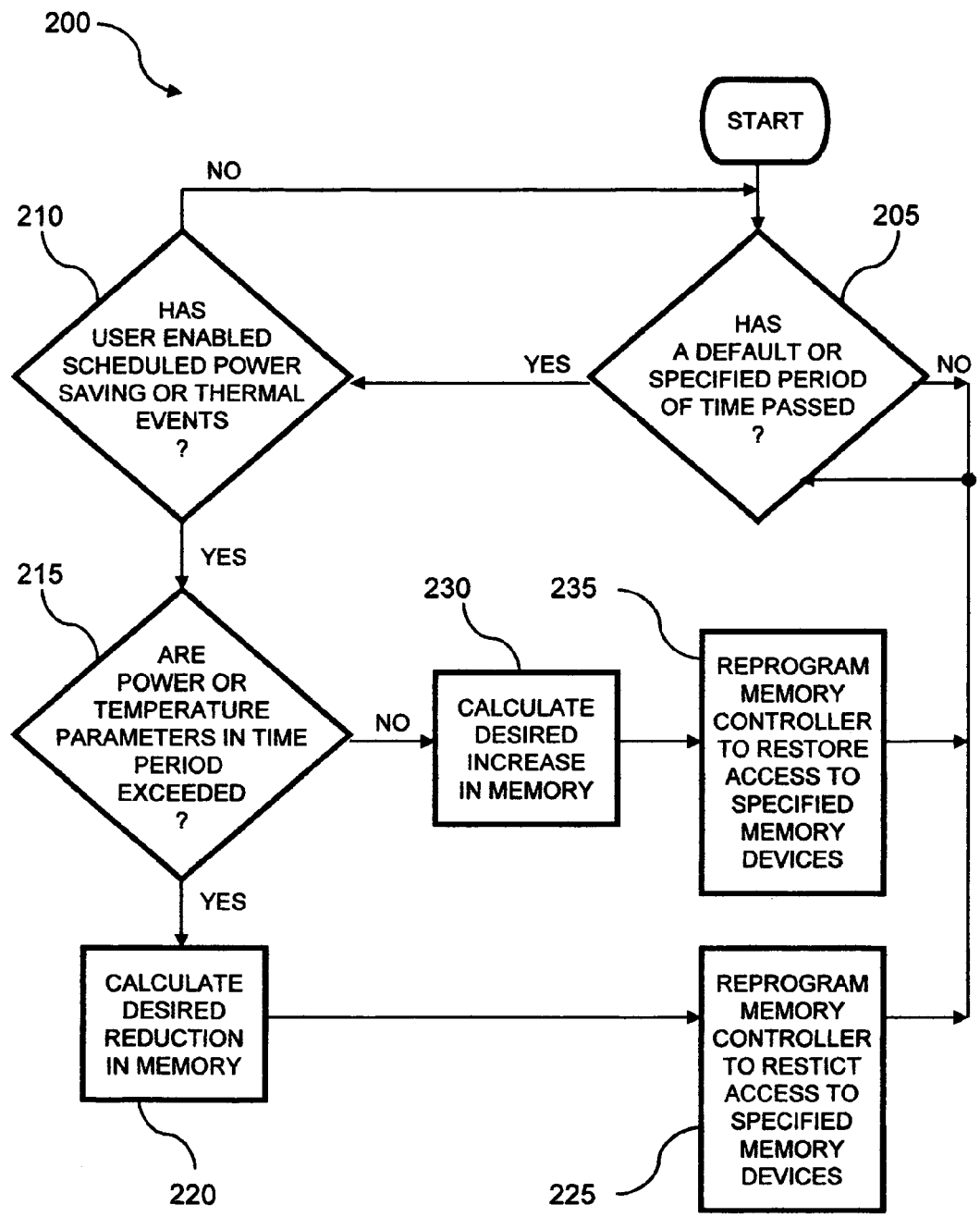
FIG. 2 is a flow chart illustrating a process of balancing performance against electrical power consumption and corresponding generation of waste heat by controlling how much memory is available in some embodiments.

Turning to FIG. 2, there is shown a flow chart illustrating a process 200 of balancing computing performance against electrical power consumption and corresponding generation of waste heat by controlling how much memory is available in some embodiments. Before the process 200 begins, a user such as an IT administrator with access to the computer or terminal 120 has an opportunity to set power and/or temperature limitations as a function of time or times, such as specific times of the day and times of the week, etc. The user then can enable the automatic scheduled power saving and/or thermal events defined by those limitations to trigger the process 200 described herein and can specify how often to review those events. For example, the user may set a maximum power parameter which is periodically compared with readings from the power sensor 105 and maximum temperature parameter which is periodically compared with a temperature reading from the temperature sensor 110 and event timing parameters to define periods of time for periodically making these comparisons. Embodiments have the ability to allow the user to monitor and essentially immediately override the process 200 and force a desired change in memory 145, however, the focus here is on automatic monitoring and response as configured by the user. For this process 200, the response is to use the SMC 140 to adjust the amount of memory 145 available to the CPU 130 as suggested by the user-defined power and/or temperature parameters when compared to the power and/or temperature readings from the sensors 105, 110.

To begin the process 200, step 205 queries whether a default or user specified period of time has elapsed, if false then checking is continued at step 205, if true, the process 200 proceeds to step 210. The user has the option to allow a default period of time to pass or select their own preferred period of time to examine current sensor readings and the current time. This gives the process 200 more flexibility, for example, in rapidly changing situations the time period for review can be decreased as the user specifies. Step 210 queries whether the user has enabled scheduled power saving or thermal events, i.e., is the process 200 enabled by the user to examine and adjust memory in response to power, temperature and/or time, if true, the process 200 proceeds to step 215, if not the process 200 returns to step 205. Step 215 queries whether power or temperature parameters have been exceeded in the specified time period. To do this the current power reading from the power sensor 105 is compared against the maximum power parameter, the current temperature reading from the temperature sensor 110 is compared against the maximum temperature parameter and the current time is compared against the event timing parameters set by the user. If the power or temperature parameters are exceeded in the current time period, steps 220 and 225 are performed, if not, steps 230 and 235 are performed, after which process 200 returns to step 205. In this fashion, different power and temperature settings can be employed at different times in accordance with the user's wishes. For example, maximum performance is often desired during working hours unless a power or temperature problem arises. Performance may become less important at night with fewer or no users, thus allowing for reductions in memory to save electricity costs during those times.

In step 220, the CPU 130 calculates the desired reduction in memory corresponding to the reduction of memory needed to reduce power consumption and/or heat generation to keep the system 100 within the maximum power and temperature parameters. The power value of each controllable portion of memory 145, e.g., a Dual In-line Memory Module (DIMM), is known, so straightforward division will indicate the number of DIMMs to be made inaccessible. Minimum memory requirements to keep system performance from dropping too low are also observed by comparing a default value for a minimum memory parameter or a value set by the user. Once the CPU 130 has calculated the desired reduction in memory, the process 200 proceeds to step 225 when the CPU 130 directs the SMC 140 to restrict memory access to the memory devices specified. The OS in the CPU 130 is made aware of this change in memory 145 and adjusts accordingly, then the process returns to step 205.

Returning to step 215, in the situation where none of the parameters were exceeded, the process 200 proceeds to step 230 to determine if an increase in memory is desired and how much. This allows the system 100 to adjust to changing conditions and increase performance at the expense of power and/or thermal needs. Similar to step 220, the calculations performed by the CPU 130 are constrained by the known amount of power consumed by identifiable portions of memory 145 and the total amount of available memory 145. The CPU 130 then directs the SMC 140 in step 235 to restore access to the specified memory devices 145 and the process 200 returns to step 205.

Figure 3:
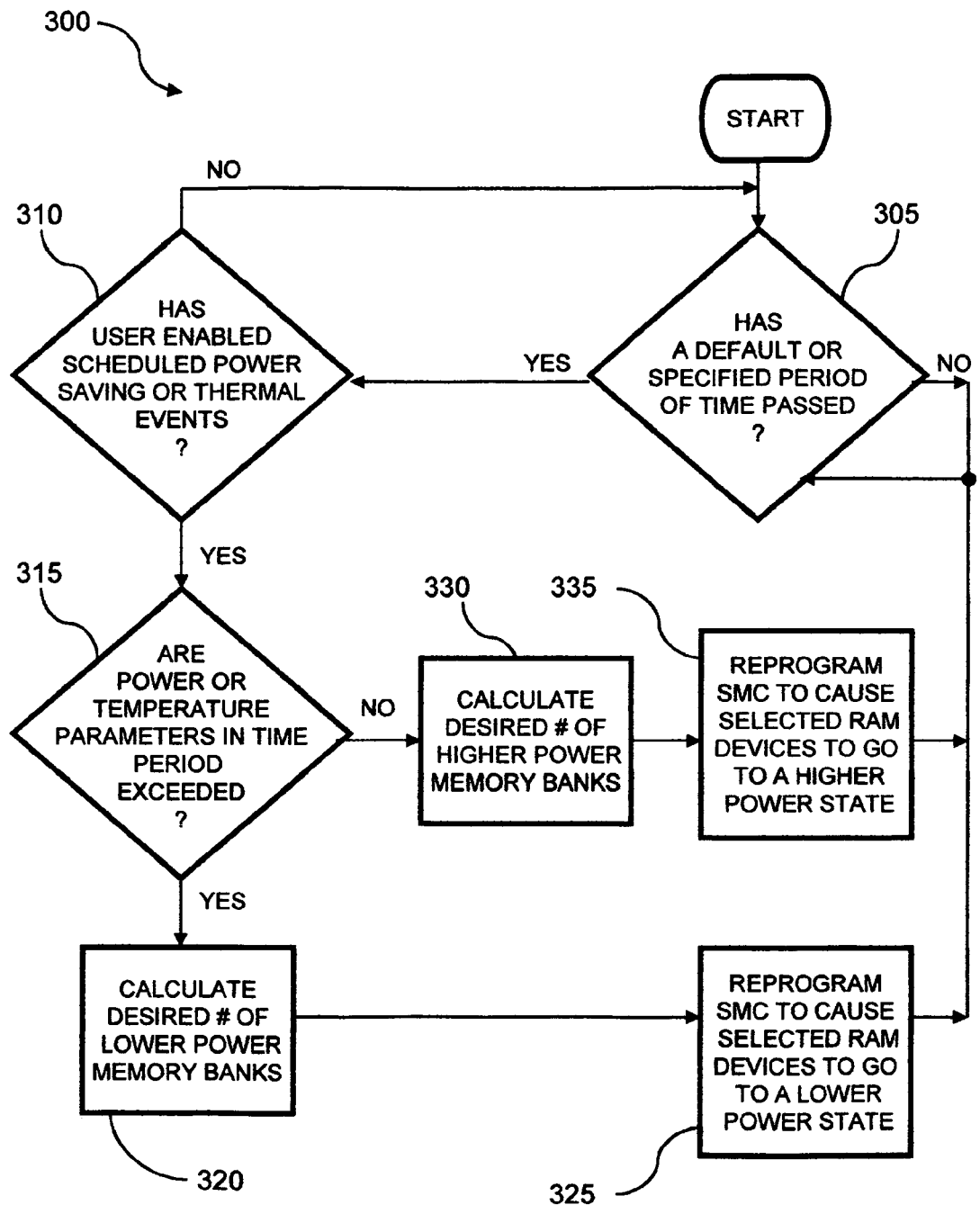
FIG. 3 is a flow chart illustrating a process of balancing performance against electrical power consumption and corresponding generation of waste heat by controlling the power settings applied to banks of memory in some embodiments.

Turning now to FIG. 3, there is shown a flow chart illustrating a process 300 of balancing computing performance against electrical power consumption and corresponding generation of waste heat by changing the power setting used to power memory 145 in some embodiments. As described herein with regard to process 200, before the process 300 begins, a user such as an IT administrator with access to the computer or terminal 120 has an opportunity to set power and/or temperature limitations as a function of time or times, such as specific times of the day and times of the week, etc. The user then can enable the automatic scheduled power saving and/or thermal events defined by those limitations to trigger the process 300 described herein and can specify how often to review those events. As with process 200, the user may set a maximum power parameter which is periodically compared with readings from the power sensor 105 and maximum temperature parameter which is periodically compared with a temperature reading from the temperature sensor 110 and event timing parameters to define periods of time for periodically making these comparisons. Embodiments have the ability to allow the user to monitor and essentially immediately override the process 300 and force a desired change in power setting applied to memory 145, however, the focus here is on automatic monitoring and response as configured by the user. For this process 300, the response is to use the SMC 140 to adjust the power setting applied to memory 145 available to the CPU 130 as suggested by the power and/or temperature parameters when compared to the power and/or temperature readings. The memory 145 must be of a type having at least two different power settings it can operate at, for example, the Micron® DDR2 1 Gbyte SDRAM has both normal and low power settings, although even more power settings are desirable and envisioned for these embodiments.

To begin the process 300, step 305 queries whether a default or user specified period of time has elapsed, if false then checking is continued at step 305, if true, the process 300 proceeds to step 310. The user has the option to allow a default period of time to pass or select their own preferred period of time to examine current sensor readings and the current time. This gives the process 300 more flexibility, for example, in rapidly changing situations the time period for review can be decreased as the user specifies. Step 310 queries whether the user has enabled scheduled power saving or thermal events, i.e., is the process 300 enabled by the user to examine and adjust memory in response to power, temperature and/or time, if true, the process 300 proceeds to step 315, if not the process 300 returns to step 305. Step 315 queries whether power or temperature parameters have been exceeded in the specified time period. To do this the current power reading from the power sensor 105 is compared against the maximum power parameter, the current temperature reading from the temperature sensor 110 is compared against the maximum temperature parameter and the current time is compared against the event timing parameters set by the user. If the power or temperature parameters are exceeded in the current time period, steps 320 and 325 are performed, if not, steps 330 and 335 are performed, after which process 300 returns to step 305. In this fashion, as in process 200, different power and temperature settings can be employed at different times in accordance with the user's wishes.

In step 320, the CPU 130 calculates the desired number of lower power memory banks of RAM 145 in order achieve the desired reduction in power consumption as needed to reduce power consumption and/or heat generation to keep the system 100 within the maximum power and temperature parameters. In some embodiments the memory devices 145 are only capable of a normal power setting and a low-power power setting. In those embodiments some memory power settings are reduced to the low-power power setting when the maximum power parameter in the current time frame has been exceeded. However, it is within the scope of the invention to use memory devices with more than two compatible power setting levels, or a range of compatible power setting levels and calculate the most desirable power setting under the circumstances and parameters specified by the user. Once the CPU 130 has calculated the desired reduction in memory power setting for the given memory devices 145, the process 300 proceeds to step 325 when the CPU 130 directs the SMC 140 to reduce the power settings applied to a number of the memory devices 145 as determined in step 320.

Returning to step 315, in the situation where none of the parameters were exceeded, the process 300 proceeds to step 330 to determine if an increase in memory power setting is desired and how many memory banks of RAM 145 should operate at this higher power setting. This allows the system 100 to adjust to changing conditions and increase performance at the expense of power and/or thermal needs, but still remain within user-specified limits. Similar to step 320, the calculations performed by the CPU 130 are constrained by the known amount of power consumed by identifiable portions of memory 145 and the total amount of available memory 145. The CPU 130 then directs the SMC 140 in step 335 to adjust the power setting to its higher "normal" level for the implicated banks of memory devices 145 and the process 300 returns to step 305. Note that the process 300 for altering the power setting applied to memory 145 can be combined with the other processes for decreasing or increasing the memory accessible to the CPU described herein.

Figure 4:
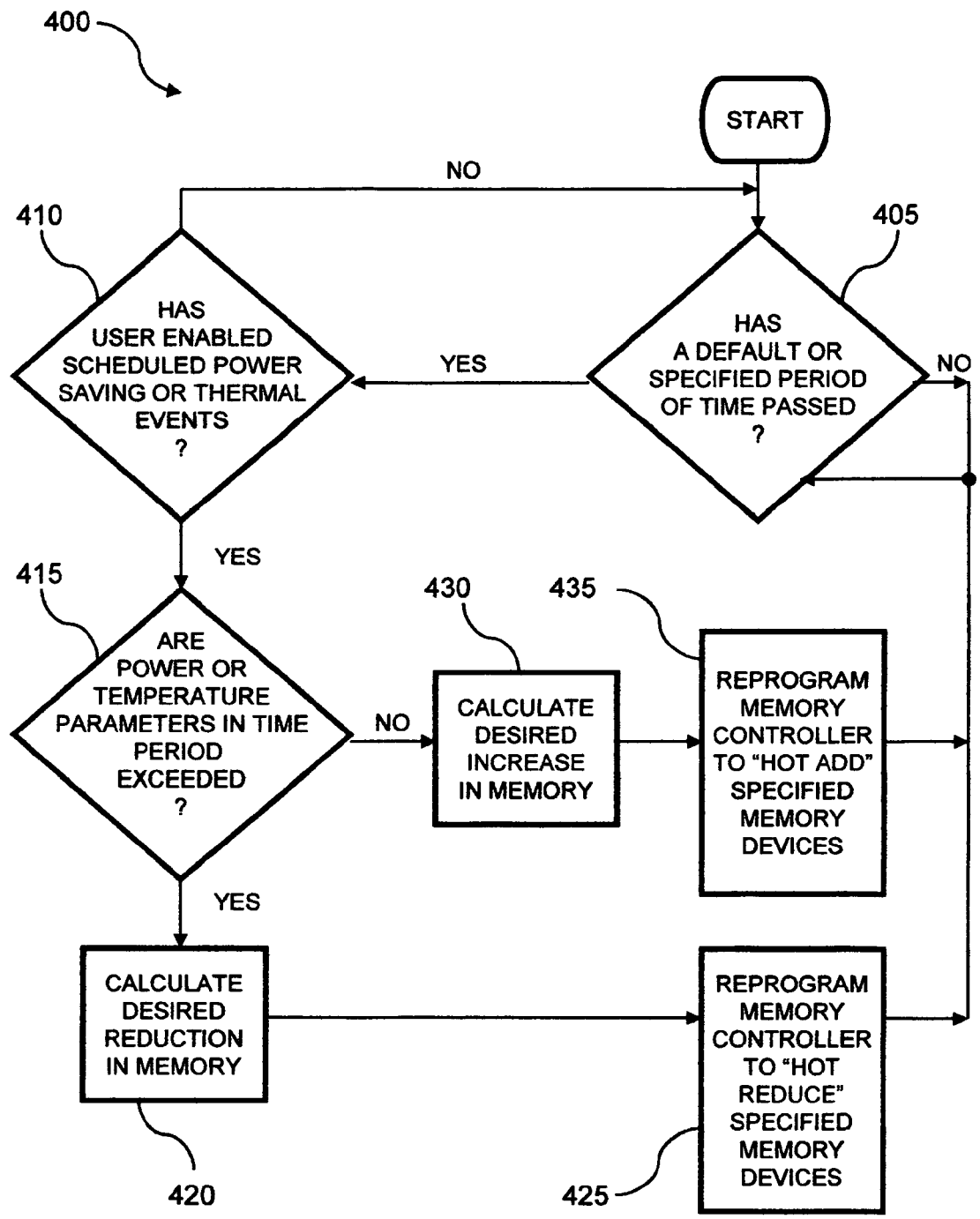
FIG. 4 is a flow chart illustrating a process of balancing performance against electrical power consumption and corresponding generation of waste heat by controlling the addition and removal of memory devices in some embodiments.

Turning now to FIG. 4, there is shown a flow chart illustrating a process 400 of balancing computing performance against electrical power consumption and corresponding generation of waste heat by "hot removing" or "hot adding" memory 145 in some embodiments. As described herein with regard to processes 200 and 300, before the process 400 begins, a user such as an IT administrator with access to the computer or terminal 120 has an opportunity to set power and/or temperature limitations as a function of time or times, such as specific times of the day and times of the week, etc. The user then can enable the automatic scheduled power saving and/or thermal events defined by those limitations to trigger the process 400 described herein and can specify how often to review those events. As with processes 200 and 300, the user may set a maximum power parameter which is periodically compared with readings from the power sensor 105 and maximum temperature parameter which is periodically compared with a temperature reading from the temperature sensor 110 and event timing parameters to define periods of time for periodically making these comparisons. Embodiments have the ability to allow the user to monitor and essentially immediately override the process 400 and force a desired change memory devices receiving power and recognized by the system 100, however, the focus here, as before, is on automatic monitoring and response as configured by the user. For this process 400, the response is to use the SMC 140 to remove or add memory 145 from the system 100 as suggested by the power and/or temperature parameters when compared to the power and/or temperature readings. It is not necessary that the memory be actually physically removed from the system 100, however, to the CPU 130 it will appear as if that memory has been removed.

As described herein with regard to processes 200 and 300, to begin the process 400, step 405 queries whether a default or user specified period of time has elapsed, if false then checking is continued at step 405, if true, the process 400 proceeds to step 410. The user has the option to allow a default period of time to pass or select their own preferred period of time to examine current sensor readings and the current time. This gives the process 400 more flexibility, for example, in rapidly changing situations the time period for review can be decreased as the user specifies. Step 410 queries whether the user has enabled scheduled power saving or thermal events, i.e., is the process 400 enabled by the user to examine and adjust memory in response to power, temperature and/or time, if true, the process 400 proceeds to step 415, if not the process 400 returns to step 405. Step 415 queries whether power or temperature parameters have been exceeded in the specified time period. As with processes 200 and 300, in process 400 the current power reading from the power sensor 105 is compared against the maximum power parameter, the current temperature reading from the temperature sensor 110 is compared against the maximum temperature parameter and the current time is compared against the event timing parameters set by the user. If the power or temperature parameters are exceeded in the current time period, steps 420 and 425 are performed, if not, steps 430 and 435 are performed, after which process 400 returns to step 405. In this fashion, as in processes 200 and 300, different power and temperature settings can be employed at different times by removing or adding memory in accordance with the user's wishes.

In step 420, the CPU 130 calculates the desired reduction in memory devices 145 needed to reduce power consumption and/or heat generation to keep the system 100 within the maximum power and temperature parameters. Process 400 is constrained by minimal levels of memory necessary to keep the system functioning. Once the CPU 130 has calculated the desired reduction in memory devices 145, the process 400 proceeds to step 425 when the CPU 130 directs the SMC 140 to "hot remove" the designated memory devices 145. The actual process of performing a "hot remove" or "hot add" of memory 145 involves both hardware and software components of the system 100 as described in U.S. Pat. No. 7,035,953, hereby incorporated by reference in its entirety. In general, and in the case of a hot remove, the system 100 determines if a memory board 145 can be removed by a user, the OS is informed of the reduction in memory 145, memory traffic is stopped and the memory board 145 is powered down as described in U.S. Pat. No. 7,035,953.

Returning to step 415, in the situation where none of the parameters were exceeded, the process 400 proceeds to step 430 to determine if an increase in memory is desired and how much. This allows the system 100 to adjust to changing conditions and increase performance at the expense of power and/or thermal needs. Similar to step 420, the calculations performed by the CPU 130 are constrained by the known amount of power consumed by memory 145 and the total amount of available memory 145. The CPU 130 then directs the SMC 140 in step 435 to "hot add" the designated memory devices 145 and the process 400 returns to step 405. As with the "hot remove" process, the "hot add" of memory 145 involves both hardware and software components of the system 100 as described in U.S. Pat. No. 7,035,953. In general, and in the case of a hot add, the system determines if a memory board 145 can be inserted by a user, the memory 145 is inserted into the system 100, powered up, and the OS is informed of the increase in available memory 145 as described in U.S. Pat. No. 7,035,953.

The foregoing has described the principles and modes employed in various embodiments. However, the embodiments should not be construed as being limited to the particular embodiments discussed. The above-described embodiments should be regarded as illustrative rather than restrictive, and it should be appreciated that variations may be made in those embodiments by those skilled in the art without departing from the scope of the embodiments of the present invention as defined by the following claims.

What is claimed is:

1. A method of controlling power consumption of a computing device having memory and at least one CPU, comprising:
   providing an operational parameter describing an operational aspect of the computing device;
   sensing the operational aspect of the computing device to provide an indication of the operational aspect of the computing device;
   periodically comparing the indication of the operational aspect of the computing device against the operational parameter to produce a comparison result; and
   adjusting the amount of memory available to the at least one CPU depending on the comparison result,
   wherein the operational parameter is specified for a limited period of time.

2. The method of claim 1, wherein the operational parameter describing an operational aspect of the computing device is a power consumption parameter.

3. The method of claim 2, wherein the power consumption parameter is specified by a user.

4. The method of claim 2, wherein the power consumption parameter describing a power consumption level specifies a maximum power consumption level.

5. The method of claim 4, wherein the maximum power consumption level is specified for the limited period of time.

6. The method of claim 1, wherein a user defines how often the step of periodically comparing is performed.

7. The method of claim 1, wherein the step of adjusting the amount of memory available results in a reduction of memory accessible to the CPU.

8. The method of claim 1, wherein the step of adjusting the amount of memory available results in an increase of memory accessible to the CPU.

9. The method of claim 1, wherein the step of adjusting the amount of memory available results in a reduction of power setting applied to memory accessible to the CPU.

10. The method of claim 1, wherein the step of adjusting the amount of memory available results in an increase of power applied to memory accessible to the CPU.

11. The method of claim 1, wherein the step of adjusting the amount of memory available results in a hot reduction of memory accessible to the CPU.

12. The method of claim 1, wherein the step of adjusting the amount of memory available results in a hot addition of memory accessible to the CPU.

13. The method of claim 1, wherein the operational parameter describing an operational aspect of the computing device is a temperature parameter.

14. The method of claim 13, wherein the temperature parameter is specified by a user.

15. The method of claim 13, wherein the temperature parameter describing a temperature level specifies a maximum temperature level.

16. The method of claim 15, wherein the maximum temperature level is specified for the limited period of time.

17. A system including a computing device having memory and at least one CPU, the computing device capable of adjusting an amount of memory available to the at least one CPU in response to power consumption and temperature, comprising:
   a baseboard management controller;
   a power sensor communicatively coupled to the baseboard management controller, the power sensor adapted to sense power consumption and provide an indication of power consumption to the baseboard management controller;
   a temperature sensor communicatively coupled to the baseboard management controller, the temperature sensor adapted to sense temperature and provide an indication of that temperature to the baseboard management controller;
   a system management interrupt device communicatively coupled to the baseboard management controller to receive signals from the baseboard management controller and provide an interrupt signal;
   a CPU, the CPU communicatively coupled to the system management interrupt device to receive the interrupt signal from the system management interrupt device, the CPU being prompted by the interrupt signal to instruct a system memory controller to reduce the amount of memory that can be accessed based at least in part on the indication of power consumption or the indication of temperature.

18. A computing device having memory, the computing device capable of adjusting an amount and/or performance of memory in response to an operational aspect of the system, comprising:
   at least one CPU, the at least one CPU being integral to the computing device having memory; and
   an operational sensor, the operational sensor communicatively coupled to the CPU, the operational sensor adapted to sense an operational aspect of the system and provide an indication of the operational aspect, wherein the memory available to the CPU is adjusted in response to a comparison of the indication of the operational aspect of the system to an operational parameter describing the operational aspect of the system, and wherein the operational parameter is specified for a limited period of time.

19. The computing device of claim 18, wherein the operational aspect is power consumption.

20. The computing device of claim 18, wherein the operational aspect is temperature.

21. The computing device of claim 19, wherein the memory available to the CPU is reduced in response to power consumption exceeding a power consumption parameter.

22. The computing device of claim 20, wherein the memory available to the CPU is reduced in response to a temperature associated with the system exceeding a thermal parameter.

* * * * *